(12) United States Patent
Sato et al.

(10) Patent No.: US 7,656,274 B2
(45) Date of Patent: Feb. 2, 2010

(54) GROUP ANALYSIS SYSTEM AND GROUP ANALYSIS EQUIPMENT

(75) Inventors: Nobuo Sato, Saitama (JP); Norio Ohkubo, Tokyo (JP); Norihiko Moriwaki, Hachioji (JP); Yoshihiro Wakisaka, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 12/000,141

(22) Filed: Dec. 10, 2007

(65) Prior Publication Data
US 2008/0169919 A1    Jul. 17, 2008

(30) Foreign Application Priority Data
Jan. 15, 2007    (JP) .............................. 2007-006151

(51) Int. Cl.
*G08B 9/00* (2006.01)
(52) U.S. Cl. ................................................ 340/286.02
(58) Field of Classification Search ............ 340/286.02, 340/7.46, 10.32, 825.69, 517; 455/519
See application file for complete search history.

(56) References Cited

U.S. PATENT DOCUMENTS

| | | | |
|---|---|---|---|
| 5,697,097 A * | 12/1997 | Reibel et al. ............... | 340/7.35 |
| 5,787,343 A * | 7/1998 | Iijima et al. ............... | 455/426.2 |
| 2007/0208669 A1* | 9/2007 | Rivette et al. .................. | 705/59 |
| 2008/0086551 A1* | 4/2008 | Moy .......................... | 709/223 |
| 2008/0159634 A1* | 7/2008 | Sharma et al. .............. | 382/224 |

FOREIGN PATENT DOCUMENTS

JP    2004-028642    6/2002

* cited by examiner

*Primary Examiner*—Phung Nguyen
(74) *Attorney, Agent, or Firm*—Stites & Harbison PLLC; Juan Carlos A. Marquez, Esq.

(57) ABSTRACT

Face-to-face detection by infrared-ray communication is effective in grasping interaction between persons. However the problem here is that infrared rays have a high directivity and detection fails unless the persons face each other right in front. Sensor signals having a high directivity and sensor signals having a low directivity are obtained from a sensor terminal (TR) carried by a person. Firstly, information on relative position is obtained with a sensor (TRIR) of infrared rays or the like having a high directivity and an initial group is formed at an application server (AS). A feature amount such as sound that has a low directivity and can sense surrounding environmental information is extracted from among the terminals (TRs) belonging to the initial group by personal feature extraction (ASIF), correlation with terminals (TRs) not belonging to a group is obtained, and thereby whether or not those terminals (TRs) belong to an identical group is judged.

15 Claims, 14 Drawing Sheets

FIG. 6

SENSING TYPE JUDGING FUNCTION (JA)

| SENSING TYPE (ST) | JUDGING FUNCTION (JA) |
|---|---|
| SENSING TYPE 1 (ST1) | · JUDGING FUNCTION 1 (JA1)<br>· JUDGING FUNCTION 3 (JA3) |
| SENSING TYPE 2 (ST2) | · JUDGING FUNCTION 2 (JA2)<br>· JUDGING FUNCTION 3 (JA3) |

FIG. 7

SENSOR DATABASE (SSDBSE)

| TIME (SSTI)<br>CONTENT (SSCD) | 2006/06/08<br>16:11:00<br>(SSTI1) | 2006/06/08<br>16:12:00<br>(SSTI2) | 2006/06/08<br>16:13:00<br>(SSTI3) | 2006/06/08<br>16:14:00<br>(SSTI4) | 2006/06/08<br>16:15:00<br>(SSTI5) | 2006/06/08<br>16:16:00<br>(SSTI6) |
|---|---|---|---|---|---|---|
| TIME STAMP (SSTS) | | | | | | |
| TERMINAL ID (SSTD) | | | | | | |
| INFRARED (SSID) | | | | | | |
| TEMPERATURE (SSTE) | | | | | | |
| SOUND (SSSD) | | | | | | |
| ACCELERATION (SSAD) | | | | | | |
| ILLUMINANCE (SSLD) | | | | | | |

FIG. 8

GROUP/PERSON DATABASE (ASDBGP)

| TERMINAL [NAME] (ASTD) / TIME (ASTI) | TERMINAL (TR) TAKAHASHI (ASTD1) | TERMINAL 2 (TR2) SUZUKI (ASTD2) | TERMINAL 3 (TR3) ITOH (ASTD3) | TERMINAL 4 (TR4) TANAKA (ASTD4) | TERMINAL 5 (TR5) WATANABE (ASTD5) | TERMINAL 6 (TR6) SATOH (ASTD6) | TERMINAL 7 (TR7) YAMAMOTO (ASTD7) |
|---|---|---|---|---|---|---|---|
| 2006/06/08 16:11:00 ~ 2006/06/08 16:16:00 (ASTI1) | 1 | 1 | 3 | 3 | 2 | 2 | 4 |
|  |  |  |  |  |  |  |  |
|  |  |  |  |  |  |  |  |
|  |  |  |  |  |  |  |  |
|  |  |  |  |  |  |  |  |

FIG. 13

GROUP/PERSON FEATURE QUANTITY DATABASE (ASDBGPF)

| GROUP/PERSON (ASGP) | | FEATURE AMOUNT (ASFE) | AVERAGE OF SOUND (ASFE1) | MINIMAL VALUE OF SOUND (ASFE2) | MINIMUM VALUE OF SOUND (ASFE3) | DISPERSION OF SOUND (ASFE4) |
|---|---|---|---|---|---|---|
| GROUP 1 (ASGPT31) | | TOTAL (ASGPT31G) | | | | |
| | | PERSON (ASGPT31P1) | | | | |
| | | PERSON (ASGPT31P2) | | | | |
| GROUP 2 (ASGPT32) | | TOTAL (ASGPT32G) | | | | |
| | | PERSON (ASGPT32P1) | | | | |
| | | PERSON (ASGPT32P2) | | | | |
| GROUP 3 (ASGPT33) | | TOTAL (ASGPT33G) | | | | |
| | | PERSON (ASGPT33P1) | | | | |
| | | PERSON (ASGPT33P2) | | | | |
| PERSON 4 (ASGPT34) | | | | | | |

GROUP ANALYSIS SYSTEM AND GROUP ANALYSIS EQUIPMENT

CLAIM OF PRIORITY

The present application claims priority from Japanese application JP 2007-006151 filed on Jan. 15, 2007, the content of which is hereby incorporated by reference into this application.

FIELD OF THE INVENTION

The present invention relates to a technology of detecting relative positions of terminals and carrying out group analysis with sensor signals sent from the terminals carried by persons.

BACKGROUND OF THE INVENTION

It is possible to further accelerate a project by: keeping track of the progress of business and recording the business contents of individuals (members) in the project; and thereby visualizing and sharing the problems arising during the management of the project. Further, as a member, the member can easily look back his own business afterward by visualizing daily business and hence the difference from the business policy that has been determined by himself/herself becomes obvious and can be used as an indicator for the improvement of himself.

In particular, a person behaves variously in his daily life by having some relationship with another person. In this regard, it is very effective from the viewpoint of grasping the movement of an individual to know the relationship among plural persons by analyzing a group such as a project. In view of such background, for example JP-A No. 2004-028642 discloses a technology wherein a terminal carried by a person: computes relative positions between terminals through the data communication with another terminal by using an identifier (ID); further keeps track of the absolute position of the person himself by using the global positioning system (GPS); displays the two pieces of information on a map; and thereby groups the terminals.

SUMMARY OF THE INVENTION

It is possible to group plural persons having terminals on the basis of positional information by conventional technologies. However, behavior of a person is complicated and, merely with the positional information alone, it is limited to: accurately extract human relations wherein interaction takes place actually; and obtain useful information. For example, the existence of plural persons nearby may be only accidental and inversely there might be some occasions where distant plural persons talk to each other.

In the meantime, face-to-face detection by infrared-ray communication is effective in grasping interaction between persons. However the problem here is that infrared rays have a high directivity and detection fails unless the persons face each other right in front.

An object of the present invention is to provide a group analysis system and group analysis equipment capable of detecting that interaction takes place among plural persons even when they do not face each other right in front.

In order to attain the above object, the present invention is a group analysis system comprising a plurality of sensor terminals and a controller connected to the plural sensor terminals, wherein firstly each of the sensor terminals has a first sensor to detect relative positions and a second sensor to acquire surrounding environmental information. Then the controller acquires sensor signals from the first and second sensors in each of the sensor terminals through an input-output unit and, in an analyzer, sets an initial group of the sensor terminals with the sensor signals of the first sensor, and extracts the feature quantity of the initial group from the sensor signals of the second sensor received from each of the sensor terminals constituting the initial group. The group to which a sensor terminal not belonging to the initial group belongs is decided by comparing the feature quantity of the initial group with the feature quantity, corresponding to the feature quantity of the initial group, extracted from sensor signals of the second sensor of a sensor terminal allegedly having no initial group to belong to.

That is, in the present invention, target persons are made to have sensor terminals and group analysis is carried out from relative information among the sensor terminals. In the analysis, signals from a sensor having a strong directivity and a sensor having a weak directivity are used preferably. Firstly, relative positional information among persons is acquired with sensor signals obtainable from a sensor having a strong directivity and an initial group is formed. A feature quantity that surrounding environmental information can sense is extracted from among the sensor terminals belonging to the initial group with sensor signals obtainable from a sensor having a weak directivity. Then whether or not the sensor terminals belong to an identical group is judged by acquiring correlation with a sensor terminal not belonging to the group.

From the above, it is possible to extract interaction among persons not by sensing a site where a person exists (absolute positioning) but by sensing relative positional information of sensor terminals.

By the present invention, it is possible to detect terminals constituting a group even in the case of not facing each other right in front by forming the group at two stages on the basis of the characteristics of the sensor signals of each terminal. Further, although, in the case of not classifying into two stages, the frequency of comparison between terminals is the factorial of the number of the terminals since all the terminals must be subjected to analysis, it is possible to reduce the analysis frequency by dividing into two stages.

By so doing, it is possible to carry out accurately and quickly group analysis for the visualization of daily business such as behavior measurement of blue-collars and business measurement of white-collars.

BRIEF DESCRIPTION OF THE DRAWINGS

FIG. 6 is a table showing judging functions for sensing types respectively in the first embodiment;

FIG. 7 is a table showing a sensor database (SSDBSE) to store sensor signals in the first embodiment;

FIG. 8 is a table showing a group/person database (ASDBGP) to store the results of group analysis in the first embodiment;

FIG. 13 is a table showing a group/person feature quantity database (ASDBGPF) to store feature quantities for carrying out group analysis by the judging function 3 in the first embodiment;

DETAILED DESCRIPTION OF THE PREFERRED EMBODIMENTS

Embodiments according to the present invention are hereunder explained in detail in reference to drawings.

Embodiment 1

Figure 1:
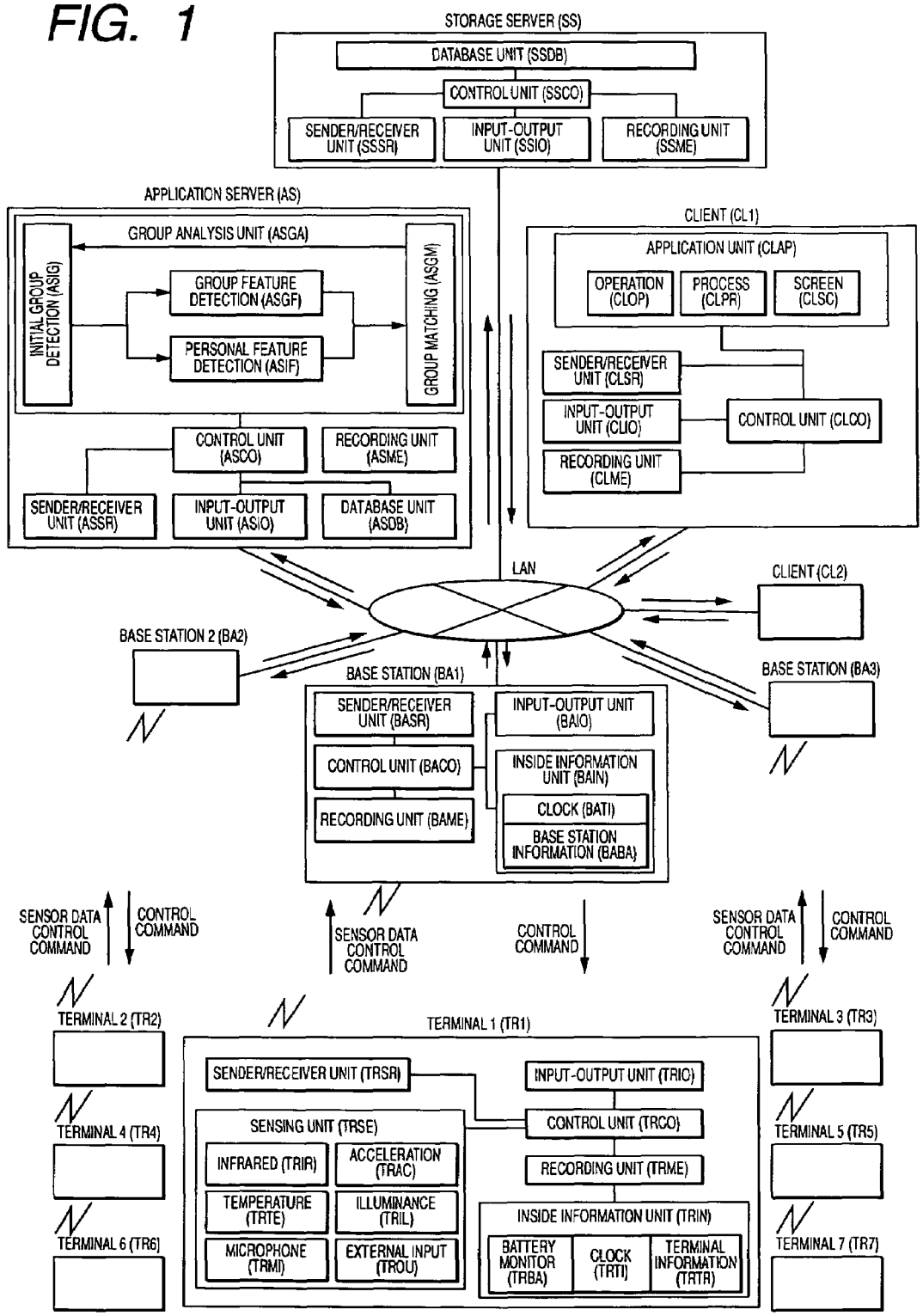
FIG. 1 is a view showing the whole configuration from terminals to transmit sensor signals to an application unit to display group analysis results according to the first embodiment of the present invention.

FIG. 1 is a view showing a whole group analysis system from sensor terminals to transmit sensor signals (sensing data) to an application unit-to display group analysis results according to the first embodiment. In the present embodiment, a target person is made to carry a sensor terminal and group analysis is carried out with a high degree of accuracy from relative information between sensor terminals carried by persons without specifying the locations of the persons.

In FIG. 1, a storage server (SS), an application server (AS), clients (CL1 and CL2, hereunder referred to as CL), and base stations (BA1 and BA2, hereunder referred to as BA) are connected to each other through a local area network (LAN) and the base stations (BAs) transmit and receive data wirelessly to and from terminals (TR1 to TR7, hereunder referred to as TR).

The terminals (TRs) are sensor terminals to carry out sensing at the sites and are possessed by target persons. Each terminal (TR) comprises a sender/receiver unit (TRSR), a sensing unit (TRSE), an input-output unit (TRIO), a control unit (TRCO), a recording unit (TRME), and an inside information unit (TRIN). In the present embodiment, the sensing unit (TRSE) contains plural sensors therein, infrared (TRIR) is used for a first sensor to detect relative location information like face-to-face detection, and a person carrying the terminal is subjected to face-to-face detection with the infrared sensor. Consequently, it is desirable to carry a terminal (TR) so as to be visible from an opponent. An example is to hang a terminal (TR) from a neck.

A terminal (TR) transmits sensor signals that are a value sensed at the sensing unit including the infrared sensor as the first sensor from the sender/receiver unit (TRSR) to a base station (BA). The sender/receiver unit (TRSR) sends and receives data to and from the base station (BA) by wireless communication based on, for example, IEEE802.15.4 Standard. As the transmission methods, there are a method of sending sensor signals in response to a control command sent from the base station (BA), a method of sending sensor signals to the base station (BA) periodically, and a method of sending sensor signals to the base station (BA) immediately after receiving sensor signals. Further, the change of control information regarding the terminal (TR) and output to an output device in the input-output unit (TRIO) are carried out in response to a control command sent from the base station (BA). Furthermore, items selected by an input device such as a button at the input-output unit (TRIO) are sent to the base station (BA) as control commands.

As stated above, the sensing unit (TRSE) senses a site. As the sensors used for sensing, in addition to infrared (TRIR) as the first sensor, there are temperature (TRTE), a microphone (TRMI), acceleration (TRAC), and illuminance (TRIL) as the second sensor to extract a feature quantity as surrounding environmental information. Further, by using a terminal of the external input (TROU), it is possible to cope with the case of adding a new sensor such as a gravity sensor, an image sensor, or the like. With those sensors, it is possible to obtain information on surrounding environment wherein a person carrying the sensor exists, in addition to face-to-face detection as the relative position detection of a person carrying a terminal (TR) of an infrared sensor. Here, as it will be described later in detail, by extracting a prescribed feature quantity from such environmental information, it is possible to finally decide the group to which the person possessing the terminal (TR) belongs even though it has been impossible to decide the initial group to which the person belongs by the face-to-face detection.

The input-output unit (TRIO) comprises an input device such as a button and an output device such as a liquid crystal display. The unit obtains information which the target person requests and displays sensed information. Here, a touch panel that is a device formed by integrating an input device and an output device may also be used.

The control unit (TRCO) has a CPU (Central Processing Unit) and carries out programs stored in the recording unit (TRME). The control unit (TRCO) processes the acquisition timing of sensor information, the analysis of sensor information, and the timing of transmission and reception to and from the base station (BA).

The recording unit (TRME) comprises a hard disk, a memory, or an external recording unit such as an SD (Secure Digital) card and stores programs and sensed sensor signals.

The inside information unit (TRIN) contains information on the terminal (TR) and stores the information in a similar recording unit. The recording unit (TRME) and the inside information unit (TRIN) may be generically called a memory unit in some cases. The information of the terminal (TR) includes terminal information (TRTR) as terminal specific information such as a battery monitor (TRBA) to show the remaining amount in the battery of the terminal, a clock (TRTI), and addresses. The battery monitor (TRBA) records the remaining amount of an electric power supply. The clock (TRTI) stores current time. The current time is sent from the base station (BA) periodically.

Successively, a base station (BA) is explained. A base station (BA) is placed in an area from which information is expected to obtain, and thereby receives sensor signals wirelessly sent from a terminal (TR) in the area and transmits the sensor signals to a storage server (SS) through a LAN. The base station (BA) comprises a sender/receiver unit (BASR), a control unit (BACO), a recording unit (BAME), an input-output unit (BAIO), and an inside information unit (BAIN).

The sender/receiver unit (BASR) transmits and receives data to and from a terminal (TR). The sender/receiver unit (BASR) transmits a control command to a terminal (TR) as a transmission method and receives sensor signals from a terminal (TR) periodically or receives sensor signals transmitted from a terminal (TR) immediately after various sensors of the terminal (TR) detect the sensor signals. Further, the sender/receiver unit (BASR) acquires information from the storage server (SS) and sends the results obtained from the storage server (SS) to a terminal (TR) by the control command sent from the terminal (TR). Furthermore, the unit sends items selected by an input device in the input-output unit (TRIO) of a terminal (TR) as the control command to the base station (BA) and the storage server (SS). In addition, the unit changes screen display of an output device of the input-output unit (TRIO) by the control command sent from the storage server (SS) and the terminal (TR).

The control unit (BACO) is equipped with a CPU and runs programs stored in the recording unit (BAME). The unit processes the acquisition timing of sensor information, the analysis of the sensor information, the transmission/reception timing of the base station (BA) and the storage server (SS).

The recording unit (BAME) comprises a hard disk, a memory, or an external recording unit such as an SD card, and stores programs and sensed sensor signals.

The input-output unit (BAIO) comprises an input device such as a button and an output device such as a liquid crystal display. The unit displays information on the situation in a target area and sensed information. Here, a touch panel that is a device formed by integrating an input device and an output device may also be used.

The inside information unit (BAIN) contains information on the base station (BA) and the information is stored in a similar recording unit. The recording unit (BAME) and the inside information unit (BAIN) are generically called a memory unit in some cases. In the inside information unit (BAIN), as the information of the base station (BA), there are a clock (BATI) to show time and base station information (BABA) as information intrinsic to the base station. The clock (BATI) contains current time. The clock is periodically connected to an NTP (Network Time Protocol) server, adjusts the time, and further adjusts the time of a terminal (TR) periodically.

Here, a local area network (LAN) is a network to connect base stations (BAs), a storage server (SS), an application server (AS), and clients (CLs) to each other as stated above.

Successively, the storage server (SS) stores sensor information sent from a base station (BA) and sends sensor signals (sensing data) to the application server (AS) on the basis of the request of the desired sensor signals (sensing data) from the application server (AS). Further, the server receives a control command from a base station (BA) and transmits the results obtained from the control command to the base station (BA). The storage server (SS) is an ordinary computer system comprising a database unit (SSDB), a control unit (SSCO), a sender/receiver unit (SSSR), an input-output unit (SSIO), and a recording unit (SSME).

The database unit (SSDB) stores sensor signals sent from a base station (BA). Further, the unit stores a method for treating a control command from a base station (BA).

The control unit (SSCO) is equipped with a CPU and runs programs stored in the recording unit (SSME). The unit controls the database unit (SSDB) and processes information sent from the application server (AS) and a base station (BA).

The sender/receiver unit (SSSR) exchanges transmission/reception with a base station (BA). The unit receives sensor signals (sensing data) sent from a base station (BA) and also transmits the sensor signals to the application server (AS). Further, when the unit receives a control command from a base station (BA), the unit transmits the results selected from the database unit (SSDB) to the base station (BA) The sender/receiver unit (SSSR) transmits a control command to a terminal (TR), receives sensor signals from a terminal (TR) periodically, and transmits the sensor signals from a terminal (TR) to the storage server (SS) immediately after receiving the sensor signals from the terminal (TR). Further, the unit requests to acquire information to the storage server (SS) and transmits the information resultantly acquired from the storage server (SS) to a terminal (TR) in response to the control command sent from the terminal (TR).

The input-output unit (SSIO) comprises an input device such as a button and an output device such as a liquid crystal display. The unit displays information on the situation in a target area and sensed information. Here, a touch panel that is a device formed by integrating an input device and an output device may also be used.

The recording unit (SSME) comprises a hard disk, a memory, or an external recording unit such as an SD card, and stores programs and sensed sensor signals. The recording unit (SSME) and the database unit (SSDB) may be generically called a memory unit in some cases.

Meanwhile, the application server (AS) is a server as a controller of the system to carry out group analysis from sensor signals stored in the storage server (SS) and comprises an ordinary computer system like the aforementioned storage server (SS). The application server (AS) comprises a group analysis unit (ASGA), a control unit (ASCO), a recording unit (ASME), a sender/receiver unit (ASSR), an input-output unit (ASIO), and a database unit (ASDB).

The group analysis unit (ASGA) is a section to analyze a group in terms of time by analyzing sensor signals. The group analysis unit (ASGA) processes initial group detection (ASIG), group matching (ASGM), group feature extraction (ASGF), and personal feature extraction (ASIF). The group analysis unit (ASGA) comprises ordinary programs and the programs are run with the control unit (ASCO) that is explained below.

The control unit (ASCO) is equipped with a CPU and runs programs and others stored in the recording unit (ASME). That is, the unit processes request to acquire data in the storage server (SS), the aforementioned group analysis, the management of the analysis results, etc.

The recording unit (ASME) comprises a hard disk, a memory, or an external recording unit such as an SD card, and stores the aforementioned programs, sensed sensor signals, and the analysis results.

The sender/receiver unit (ASSR) acquires data signals from the storage server (SS) and transmits the data on the basis of analysis result request from a client (CL). The input-output unit (ASIO) comprises an input device such as a button and an output device such as a liquid crystal display. The unit displays information on the situation in a target area and sensed information. Here, a touch panel that is a device formed by integrating an input device and an output device may also be used.

The database unit (ASDB) stores the results of analysis carried out in the group analysis unit (ASGA), namely the control unit (ASCO). In general, the results are memorized in a hard disk or the like. The recording unit (ASME) and the database unit (ASDB) may be generically called a memory unit in some cases.

Lastly, a client (CL), on the basis of request from a user, receives group analysis results in the application server (AS), processes data, and displays the results on a screen. The client (CL) is an ordinary personal computer (PC) comprising an application unit (CLAP), a sender/receiver unit (CLSR), an input-output unit (CLIO), a recording unit (CLME), a control unit (CLCO), etc.

The application unit (CLAP) processes data, makes a picture, and provides the data to a user on the basis of request from the user. The application unit (CLAP) includes operation (CLOP), process (CLPR), and a screen (CLSC), is configured as an ordinary program, is recorded in the after-mentioned recording unit (CLME), and is operated with the after-mentioned control unit (CLCO).

The sender/receiver unit (CLSR) transmits request for the analysis results in the range assigned by a user to the application server (AS) and receives the analysis results from the application server (AS). The input-output unit (CLIO) comprises an input device such as a button and an output device such as a liquid crystal display. The unit displays information on the situation in a target area and sensed information. Here, a touch panel that is a device formed by integrating an input device and an output device may also be used.

The recording unit (CLME) comprises a hard disk, a memory, or an external recording unit such as an SD card, and stores a main program, sensed sensor signals, and analysis results. The control unit (CLCO) is equipped with a CPU and runs programs stored in the user recording unit (CLME).

Figure 2:
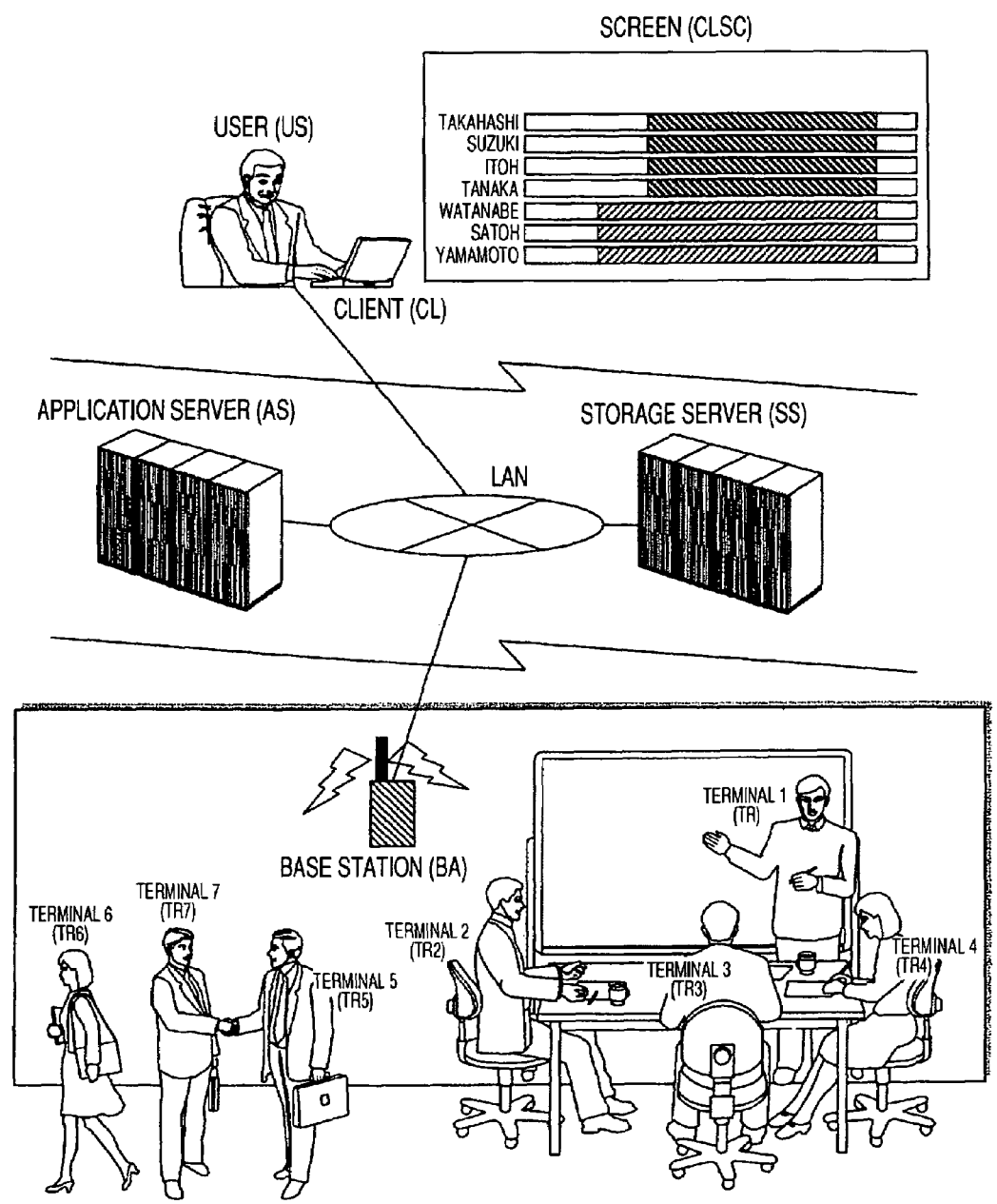
FIG. 2 is a view showing the scenes of operations up to the time when a user (US) receives information on group analysis by operating a client 1 (CL1) in the first embodiment.

FIG. 2 is a view schematically showing the scenes of operations of a group analysis system according to the first embodiment. A user receives information on group analysis by operating a client (CL).

The screen (CLSC) of the client (CL) is a picture output by the user (US) with an application in the client (CL). The screen (CLSC) shows the persons who have stayed together in temporal sequence with a graph. An application unit (CLAP) explained earlier of the client (CL) is connected to an application server (AS) and receives group analysis results stored in a database (ASDB) through a local area network (LAN).

The application server (AS) is connected to a storage server (SS) and receives sensor signals stored in a database (SSDB) through the local area network (LAN). Further, the application server (AS) is connected to the client (CL) and transmits sensor signals stored in the database (ASDB) through the local area network (LAN).

The storage server (SS) is connected to a base station (BA) and receives sensor signals through the local area network (LAN). The base station (BA) transmits sensor signals to the storage server (SS) through the local area network (LAN). The base station (BA) receives sensor signals from a terminal (TR) through a sender/receiver unit (BASR). The terminal (TR) transmits sensor signals to the base station (BA) through a sender/receiver unit (TRSR). The terminal (TR) obtains sensor signals with a sensing unit (TRSE).

Here, although the system of the present embodiment shown in FIGS. 1 and 2 is configured so that all of the storage server (SS), the application server (AS), and the client (CL) may be separately installed and connected to each other through a local area network (LAN), it goes without saying that they may be integrally configured. For example, the storage server (SS) and the application server (AS) as the upper level devices may be configured as a computer system/server functioning as an integrated management device. Further, the client (CL) may be configured as a terminal unit attached to the application server (AS) in some cases.

Figure 3:
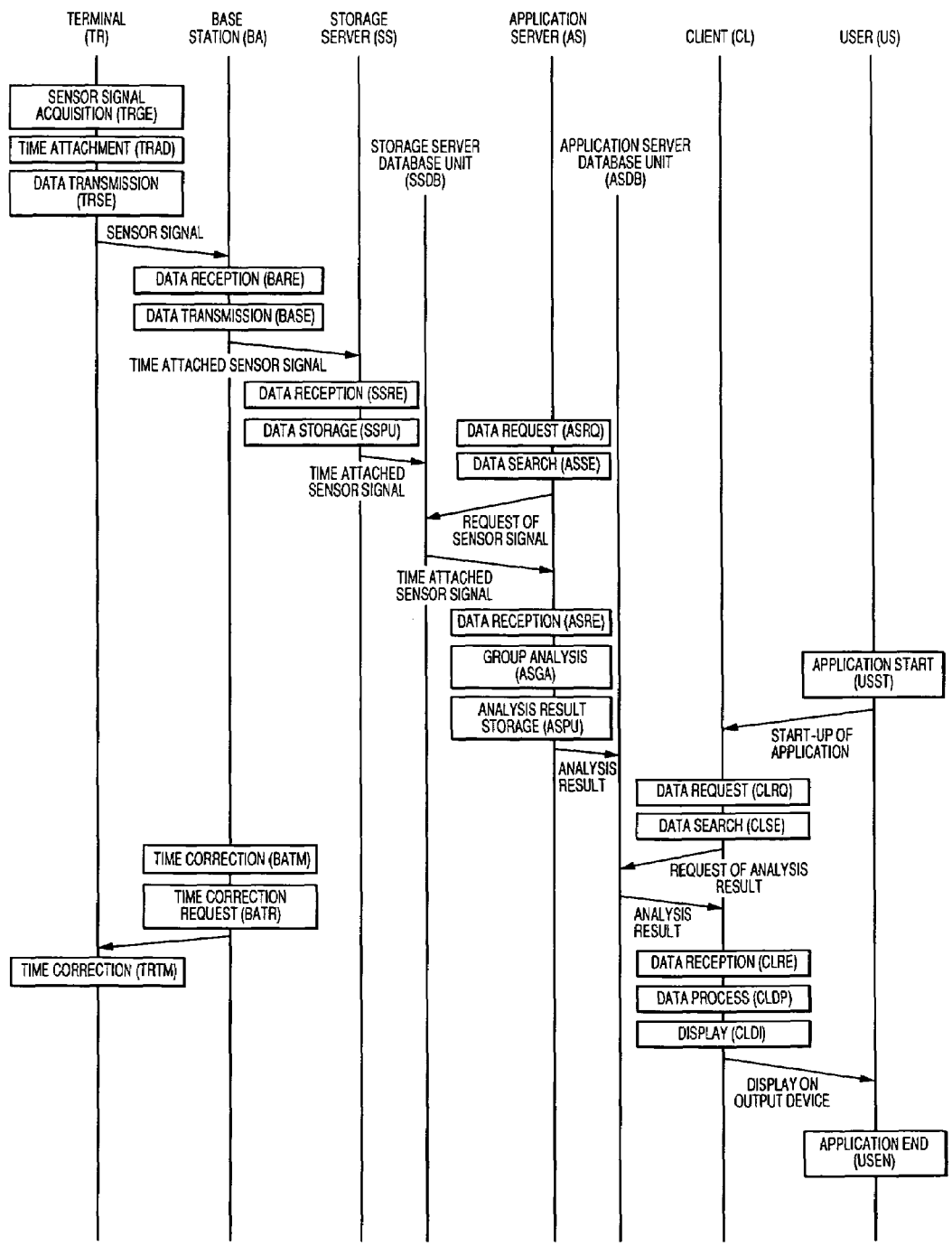
FIG. 3 is a view showing the sequence of sensor signals while they are transmitted from a terminal 1 (TR1) to a user (US) in the first embodiment.

FIG. 3 is a diagram showing the sequence of sensor signals while the analysis results of the sensor signals are transmitted from a terminal (TR) to a user (US) in a group analysis system according to the first embodiment.

The terminal (TR) receives sensor signals sensed with a sensing unit (TRSE) and transmits the sensed signals to a base station (BA). The base station (BA) receives the sensor signals from the terminal (TR) and transmits the acquired sensor signals to a storage server (SS). The storage server (SS) receives the sensor signals from the base station (BA) and stores the acquired sensor signals in a database (SSDB) of the storage server (SS).

An application server (AS) as a controller of a group analysis system requests sensor signals to the storage server (SS), carries out group analysis with the transmitted sensor signals (sensing data), and stores the results in a database (ASDB) of the application server (AS). A client (CL) requests group analysis results to the application server (AS) when the user (US) activates an application. The client (CL) processes the transmitted analysis results into information desired by the user, forms a picture, and outputs it to an output device of an input-output unit (CLIO). The user (US) activates the application of group analysis in the client (CL) and browses figures displayed on the screen of the client (CL).

The sequence of the system is hereunder described in detail. Firstly, in the process of sensor signal acquisition (TRGE) in a terminal (TR), information necessary for acquiring sensor signals such as a sampling cycle, acquisition time, etc. is described in a recording unit (TRME) in the terminal (TR) and the sensor signals are sensed on the basis of the information. The sensing is carried out with a sensor located at a sensing unit (TRSE) in the terminal (TR). Further, the sensor signals sensed with the sensing unit (TRSE) are recorded in the recording unit (TRME). Time attachment (TRAD) in the terminal (TR) is carried out by recording the time of a clock (TRTI) as the data acquisition time of the sensed data.

In data transmission (TRSE), sensor signals sensed through the sensor signal acquisition (TRGE) are transmitted to a base station (BA) through a sender/receiver unit (TRSR). Sensor signals recorded in the recording unit (TRME) are converted into a transmission format for a base station (BA) stored in the recording unit (TRME) at a control unit (TRCO), and the sensor signals converted into the transmission format are transmitted to the base station (BA) through the sender/receiver unit (TRSR). As the transmission format, a format standardized in the aforementioned radio communication is used.

In data reception (BARE) in the base station (BA), sensor signals transmitted from the sender/receiver unit (TRSR) of the terminal (TR) in the transmission format for the base station (BA) are received at a sender/receiver unit (BASR). Then the received sensor signals are stored in a recording unit (BAME).

In data transmission (BASE), the sensor signals stored in the recording unit (BAME) are transmitted to a storage server (SS) through the sender/receiver unit (BASR). The sensor signals recorded in the recording unit (BAME) are converted into a transmission format for the storage server (SS) stored in the recording unit (BAME) at a control unit (BACO), and the sensor signals converted into the transmission format are transmitted to the storage server (SS) through the sender/receiver unit (BASR).

In data reception (SSRE) in the storage server (SS), the sensor signals transmitted from the sender/receiver unit (BASR) in the base station (BA) in the transmission format for the storage server (SS) are received with a sender/receiver unit (SSSR). Then the received sensor signals are stored in a recording unit (SSME).

In data storage (SSPU), the sensor signals stored in the recording unit (SSME) are converted into a format stored in a database unit (SSDB) stored in the recording unit (SSME) at a control unit (SSCO) and are stored in the database unit (SSDB) A method for storing sensor signals in the database unit (SSDB) is desirably used as effective queries on the occasion of after-mentioned search, and there are a sensor signal name, time, a terminal name, a base station name, etc. as the effective queries. A series of processes ranging from the sensor signal acquisition (TRGE) to the data storage (SSPU) are carried out periodically.

Successively, in data request (ASRQ) with an application server (AS), sensor signals recorded in the recording unit (ASME) of the application server (AS) or a recording unit (CLME) of the client (CL) are acquired from a target terminal at a time to acquire data.

In data search (ASSE), the storage server (SS) is searched in response to the data request (ASRQ). Information necessary for the acquisition of data signals, such as the name and the address of the storage server (SS), the name of a database, the name of a table, etc., is described in the recording unit (ASME). On the occasion of data search (ASSE), the search contents are obtained from the data request (ASRQ) and information on the database is obtained from the recording unit (ASME), and thereby a command used for the search is produced. The command is converted into a transmission format for the storage server (SS) stored in the recording unit (ASME) at a control unit (ASCO) and the command converted into the transmission format is transmitted to the storage server (SS) through a sender/receiver unit (ASSR).

In data reception (ASRE), relevant sensor signals transmitted from the database unit (SSDB) in the storage server (SS) are received in response to the command of the data search (ASSE). The sensor signals received with the sender/receiver unit (ASSR) are recorded in the recording unit (ASME).

In group analysis (ASGA), the program is stored in the recording unit (ASME) and the group analysis (ASGA) is processed in the control unit (ASCO). In the group analysis (ASGA), the program is used for the analysis of a group and the analysis is carried out with the sensor signals stored in the recording unit (ASME) through the data reception (ASRE).

In analysis result storage (ASPU), the results of the group analysis (ASGA) are stored in a database unit (ASDB). On the occasion of the storage, it is desirable to store not only the analysis results but also information on analysis conditions and thus information proposed upon the data request (ASRQ) is stored together. The series of processes ranging from the data request (ASRQ) to the analysis result storage (ASPU) are carried out periodically.

Successively, in application start (USST), an application is activated by a user (US). An application is activated, a user (US) selects a start button, and thereby a desired event is displayed on a screen.

In data request (CLRQ), information necessary for the display is acquired. A user (US) selects a button of an input-output unit (CLIO) of a client (CL) and thereby the time of analysis and the target terminal information are acquired.

In data search (CLSE), search is requested to the application server (AS) in response to the data request (CLRQ) Information necessary for the acquisition of data signals, such as the name and the address of the application server (AS), the name of a database, the name of a table, etc. is described in a recording unit (CLME). On the occasion of the data search (CLSE), the search contents are obtained from the data request (CLRQ) and information in the database is obtained from the recording unit (CLME), and thereby a command used for the search is produced. The command is converted into a transmission format for the application server (AS) stored in the recording unit (CLME) at a control unit (CLCO) and the command converted into the transmission format is sent to the application server (AS) through a sender/receiver unit (CLSR).

In data reception (CLRE), relevant analysis results transmitted from the database unit (ASDB) in the application server (AS) are received in response to the command of the data search (CLSE). The analysis results received by the sender/receiver unit (CLSR) are stored in the recording unit (CLME).

In data process (CLDP), only information necessary for display is selected from the analysis results acquired through the data reception (CLRE) and is stored in the recording unit (CLME). In display (CLDI), an image or a picture is produced from the information selected through the data process (CLDP) on the basis of the display method described in the recording unit (CLME). The produced result is submitted to the user (US) Application end (USEN) represents the termination of application by a user (US).

Here, time correction (BATM) in a base station (BA) is carried out in order to adjust the time of a clock (BATI) in the base station (BA). The current time is acquired from an NTP server in a local area network (LAN). The process of the time correction (BATM) is carried out periodically.

In time correction request (BATR), time correction is requested to a terminal (TR) in order to adjust the time of the terminal (TR). In time correction (TRTM), the time of a clock (TRTI) is corrected on the basis of the time transmitted from a base station (BA) in response to the time correction request (BATR). The processes from the time correction request (BATR) to the time correction (TRTM) are carried out periodically.

Figure 4:
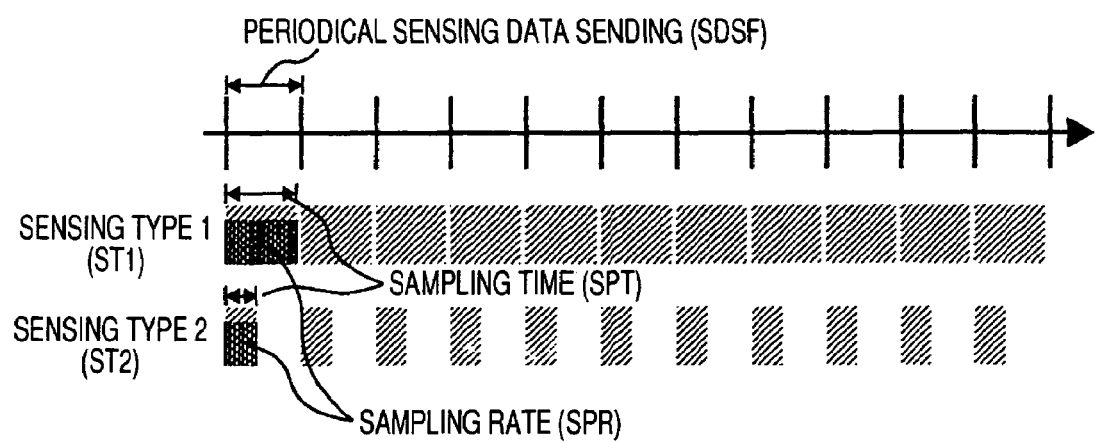
FIG. 4 is a view showing a method for sensing signals from a sensor in the first embodiment.

Meanwhile, there are various sampling types in a sensing method with a sensor in the present embodiment and one of the examples is shown in FIG. 4. Periodical sensing data sending (SDSF) represents the cycle at which sensor signals are transmitted to a base station. Sampling time (SPT) means a time spent for sampling in the periodical sensing data sending (SDSF). Sampling rate (SPR) means the number of sampling in the sampling time (SPT).

Sampling type (ST1) shows the situation wherein sampling is applied to the whole cycle of the periodical sensing data sending (SDSF). Consequently, the time of the periodical sensing data sending (SDSF) is identical to the sampling time (SPT). Sampling type (ST2) shows the situation wherein sampling is applied to a part of the cycle of the periodical sensing data sending (SDSF). Consequently, the sampling time (SPT) is shorter than the time of the periodical sensing data sending (SDSF).

A method for determining the values of the periodical sensing data sending (SDSF), the sampling time (SPT), and the sampling rate (SPR) stated above varies in accordance with the situation of usage. The optimum values are selected in response to an anticipated utilization time and an anticipated amount of communication between a terminal (TR) and a base station (BA). For example, assuming that the cycle of the periodical sensing data sending (SDSF) is 10 seconds, the sampling times (SPTs) of the sampling types (ST1) and (ST2) are 10 and 2 seconds respectively. On this occasion, the sampling rate (SPR) is set at about 50 Hz for example.

Figure 5:
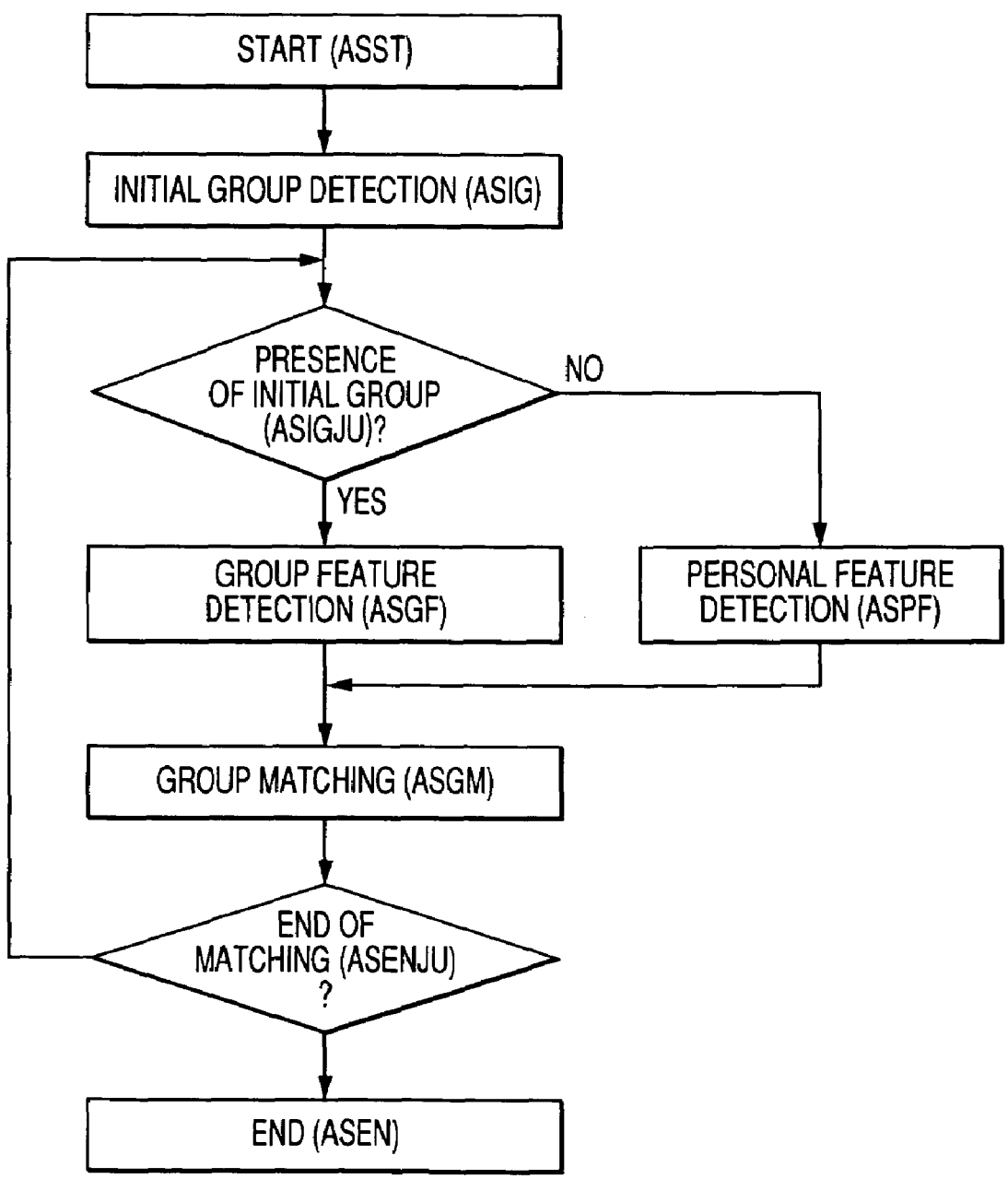
FIG. 5 is a flowchart showing group analysis to analyze identity of a facing person from sensor signals sent from a terminal in the first embodiment.

Successively, a flowchart of group analysis to analyze the identity of the group to which a person belongs from sensor signals sent from a terminal in the present embodiment is shown in FIG. 5. On the occasion of group analysis, the judging functions vary in accordance with the data acquisition methods shown in FIG. 4 and hence the relevant judging functions are explained below.

As shown in FIG. 6, the sensing type judging functions vary in accordance with a sensing type; the judging function 1 (JA1) and the judging function 3 (JA3) are applied in the case of the sensing type 1 (ST1), and the judging function 2 (JA2) and the judging function 3 (JA3) are applied in the case of the sensing type 2 (ST2).

Firstly, the judging function 1 (JA1) is explained. The judging function 1 (JA1) is applied in the case of the sensing type 1 (ST1) and is a judging function used when sampling is applied to the whole cycle of the periodical sensing data sending (SDSF).

In FIG. 5, in initial group detection (ASIG), an initial group is detected with information that comes from a sensor having a high directivity including an infrared sensor as the first sensor and is stored in an after-mentioned sensor database (SSDBSE) shown in FIG. 7. For example, an initial group is formed by carrying out face-to-face inference (detection and frequency with an infrared sensor) with infrared rays for a certain period of time. The existence (frequency) of facing is assigned to the group/person database (ASDBGP) shown in FIG. 8. Here, as other sensors having a high directivity, there are an image sensor and others.

In presence of an initial group (ASIGJU), terminals are classified into the terminals belonging to the initial group and the terminals not belonging to the initial group. That is, terminals detected as the initial group are classified into group feature extraction (ASGF) and terminals not detected as the initial group are classified into personal feature extraction (ASPF). In the group feature extraction (ASGF), a feature amount as the information showing the environment of a site (surrounding environment) is extracted from the sensor signals of a terminal belonging to the same group.

Figure 9:
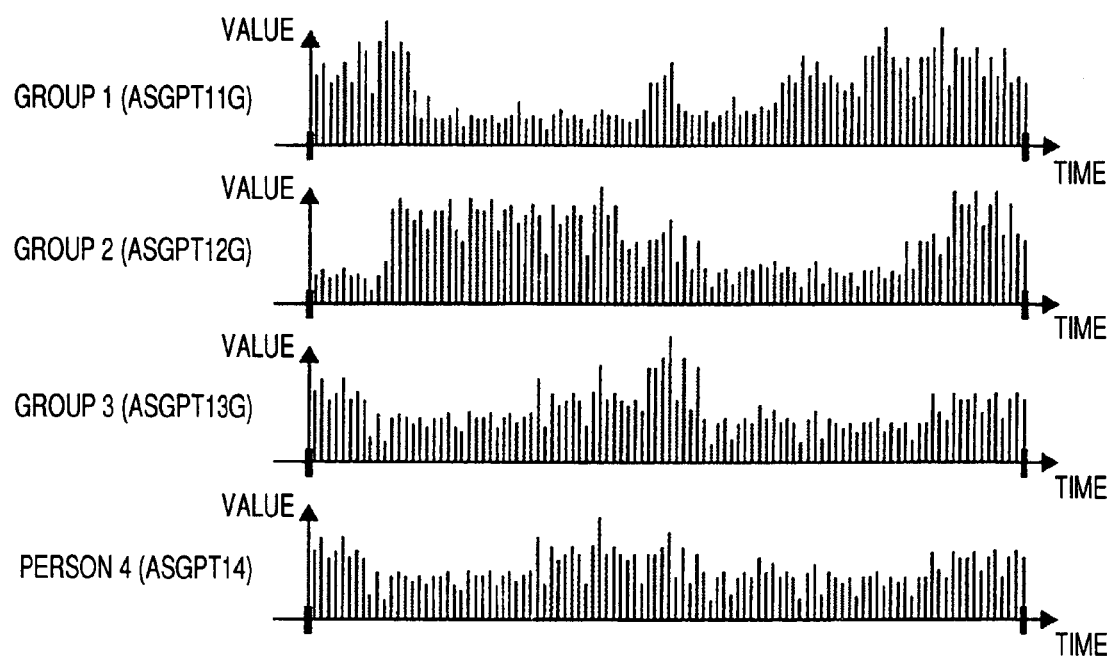
FIG. 9 is a chart showing sensor signals obtained by integrating feature quantities of groups/persons in the judging function 1 in the first embodiment.

In a feature extraction method, for example, the values of sounds (SSSDs) captured with a microphone (TRMI) as the second sensor are obtained from among the sensor signals of all the terminals detected as the identical initial group and the averages of the values are obtained in temporal sequence. In FIG. 9, the averages of the values of sounds (SSSDs) are aligned in temporal sequence for each of the group 1 (ASGPT11G), the group 2 (ASGPT12G), and the group 3 (ASGPT13G). It is desirable that the second sensor used for the feature extraction produces sensor signals that can be environmental information showing surrounding environment and it is also possible to obtain and use not only the values of sounds (SSSDs) but also temperature (TRTE), illuminance (TRIL), or a feature amount (zero-cross, energy, variance, or a regression coefficient) obtained from sounds (SSSDs), temperature (TRTE), or illuminance (TRIL).

Figure 10:
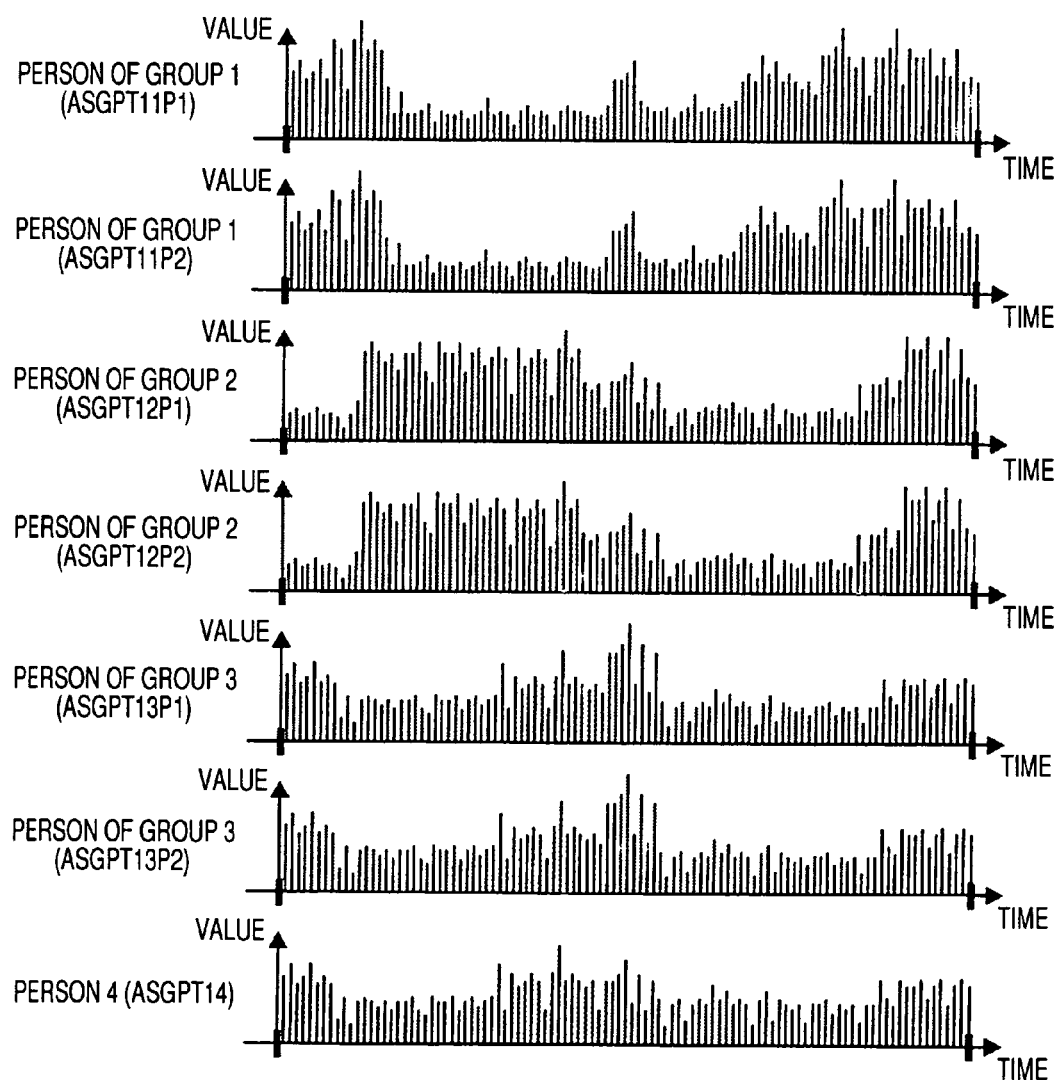
FIG. 10 is a chart showing sensor signals individually showing a feature quantity of each group/person in the judging function 1 in the first embodiment.

Further, it is also possible to use sensor signals from each of the terminals belonging to a group as shown in FIG. 10, instead of integrating them into one group. In FIG. 10, sensor signals of each person in each group are shown. That is, the persons are a person of the group 1 (ASGPT11P1), another person of the group 1 (ASGPT11P2), a person of the group 2 (ASGPT12P1), another person of the group 2 (ASGPT12P2), a person of the group 3 (ASGPT13P1), and another person of the group 3 (ASGPT13P2) In the personal feature extraction (ASPF), a feature amount showing the environment of a site is extracted from sensor signals of a terminal judged as not belonging to any group by the initial group detection (ASIG). On the occasion of the extraction, it is necessary to use the same feature extraction method as the method used for the feature amount in the group feature extraction (ASGF) since the feature amount is compared with the group feature extraction (ASGF) afterward.

In a feature extraction method, for example, the values of sounds (SSSDS) captured with a microphone (TRMI) are obtained from among sensor signals of a terminal and are aligned in temporal sequence. The person 4 (ASGPT14) in FIG. 9 is the case where the values of sounds (SSSDs) are aligned in temporal sequence. It is desirable that the second sensor used for the feature extraction produces sensor signals that can show surrounding environment and it is also possible to obtain and use not only the values of sounds (SSSDs) but also temperature (TRTE), illuminance (TRIL), or a feature amount (zero-cross, energy, variance, or a regression coefficient) obtained from sounds (SSSDs), temperature (TRTE), or illuminance (TRIL).

In group matching (ASGM), an inner volume or a distance is computed for example in order to obtain the similarity between the group feature extraction (ASGF) and the personal feature extraction (ASPF). A threshold value is set beforehand and, if a value obtained by the computation falls within the range of the threshold value, it is judged to be the same group. Then the result is assigned to the group/person database (ASDBGP) shown in FIG. 8. Further, it is also possible to get similarity among persons or groups in order to form a bigger group. For example, the person 4 (ASGPT14) shown in FIG. 9 is judged to have a high similarity with the group 3 (ASGPT13G) as a result of group matching (ASGM) and hence is decided to be included in the group 3.

The group analysis is continued until no matching occurs at the matching end (ASENJU) in the sequence shown in FIG. 5. When the analysis is continued, the process goes back to the entry side of the presence of the initial group (ASIGJU). Otherwise, it is also possible to count the frequency and repeatedly return to the entry side of the presence of an initial group (ASIGJU) until the count reaches a prescribed number.

Successively, the judging function 2 (JA2) is explained. The judging function 2 (JA2) is applied in the case of the sensing type 2 (ST2) and is a judging function used when sampling is applied only to a part of the cycle of the periodical sensing data sending (SDSF).

In the sequence shown in FIG. 5, the initial group detection (ASIG) is the same as the case of the judging function 1. The presence of an initial group (ASIGJU) is also the same as the case of the judging function 1.

Figure 11:
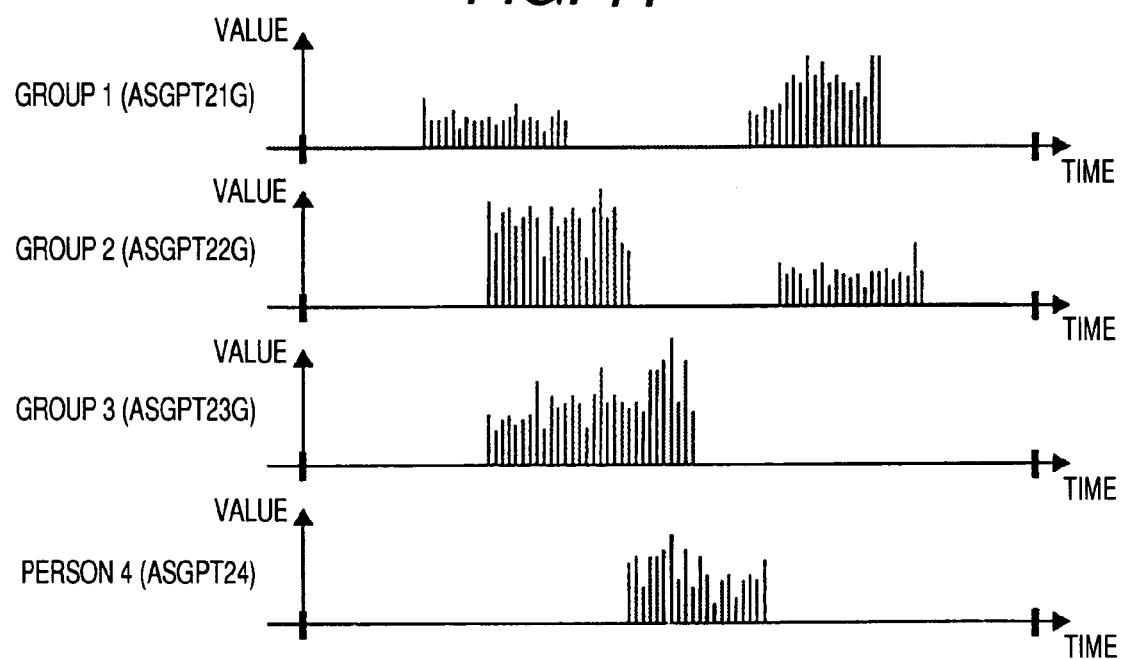
FIG. 11 is a chart showing sensor signals obtained by integrating feature quantities of groups/persons in the judging function 2 in the first embodiment.

In the group feature extraction (ASGF), a feature amount showing the environment of a site is extracted from sensor signals showing the environmental information of terminals belonging to an identical group. In a feature extraction method, for example, the values of sounds (SSSDs) captured with a microphone (TRMI) are obtained from among the sensor signals of all the terminals detected as the same initial group and aligned in temporal sequence. An example thereof is shown in FIG. 11 and, in the figure, the averages of the values of sounds (SSSDs) are aligned in temporal sequence for the group 1 (ASGPT21G), the group 2 (ASGPT22G), and the group 3 (ASGPT23G), respectively. If there are overlapping portions, the average of the values of the relevant sensors is obtained. It is desirable that the sensor used for the feature extraction produces sensor signals that can show surrounding environment and it is also possible to obtain and use not only the values of sounds (SSSDs) but also temperature (TRTE), illuminance (TRIL), or a feature amount (zero-cross, energy, variance, or a regression coefficient) obtained from sounds (SSSDs), temperature (TRTE), or illuminance (TRIL).

Figure 12:
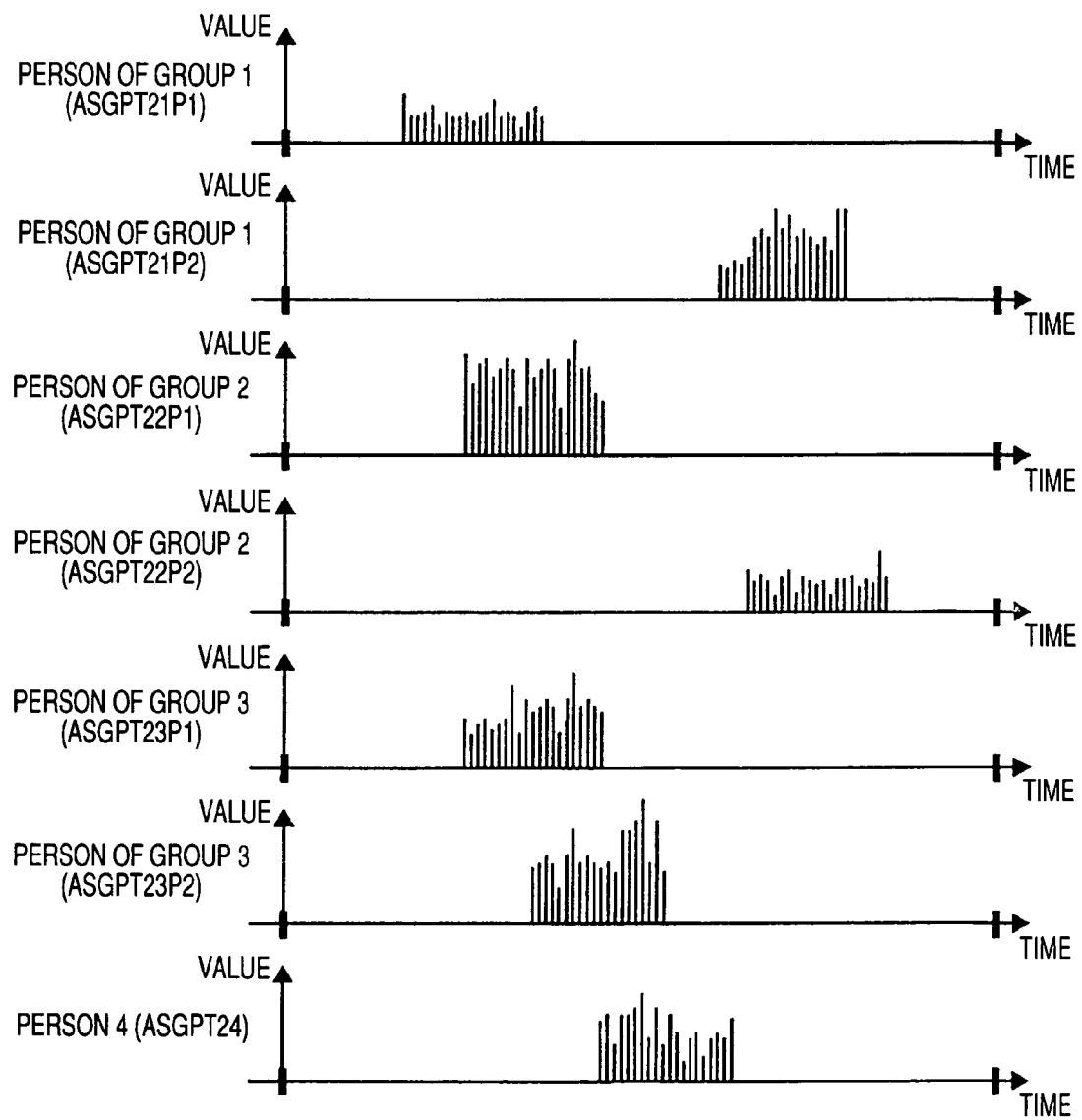
FIG. 12 is a chart showing sensor signals individually showing a feature quantity of each group/person in the judging function 2 in the first embodiment.

Further, it is also possible to not only use sensor signals by integrating them into a group as shown in FIG. 11 but also use sensor signals from terminals belonging to a group. FIG. 12 shows sensor signals of each person in each group. The persons are a person of the group 1 (ASGPT21P1), another person of the group 1 (ASGPT21P2), a person of the group 2 (ASGPT22P1), another person of the group 2 (ASGPT22P2), a person of the group 3 (ASGPT23P1), and another person of the group 3 (ASGPT23P2).

Meanwhile, in the personal feature extraction (ASPF), a feature amount showing the environment of a site is extracted from sensor signals as environmental information of a terminal not belonging to any group. On the occasion of the extraction, it is necessary to use the same feature extraction method as the method used for the feature amount in the group feature extraction (ASGF) since the feature amount is compared with the group feature extraction (ASGF) afterward.

In a feature extraction method, for example, the values of sounds (SSSDs) captured with a microphone (TRMI) are obtained from among sensor signals of terminals and are aligned in temporal sequence. The person 4 (ASGPT24) in FIG. 11 is the case where the values of sounds (SSSDs) are aligned in temporal sequence. It is desirable that the second sensor used for the feature extraction produces sensor signals that can show surrounding environmental information and it is also possible to obtain and use not only the values of sounds (SSSDS) but also temperature (TRTE), illuminance (TRIL), or a feature amount (zero-cross, energy, variance, or a regression coefficient) obtained from sounds (SSSDs), temperature (TRTE), or illuminance (TRIL).

The group matching (ASGM) is the same as the case of the judging function 1. For example, the person 4 (ASGPT24) in FIG. 11 is judged to have a high similarity with the group 3 (ASGPT23G) as a result of group matching (ASGM) and hence is decided to be included in the group 3.

Matching end (ASENJU) is the same as the case of the judging function 1.

Successively, the judging function 3 (JA3) is explained. The judging function 3 (JA3) is a judging function that can be used in both the cases of the sensing type 1 (ST1) and the sensing type 2 (ST2). In the judging function, feature amounts in the whole range are obtained and judgment is done with the feature amounts.

The initial group detection (ASIG) is the same as the case of the judging function 1. The presence of an initial group (ASIGJU) is also the same as the case of the judging function 1.

In the group feature extraction (ASGF), a feature amount showing the environment of a site is extracted from sensor signals of terminals belonging to an identical group. In the feature extraction method, for example, the average of sounds, the maximal value of sounds, the minimum value of sounds, and the dispersion of sounds of terminals belonging to a group, or the average of sounds, the maximal value of sounds, the minimum value of sounds, and the dispersion of sounds in a group are obtained. The results are assigned to the group/person feature quantity database (ASDBGPF) in FIG. 13.

The values of the total (ASGPT31G), the total (ASGPT32G), and the total (ASGPT33G) in the group/person feature quantity database (ASDBGPF) shown in FIG. 13 are obtained by assigning the feature amounts for the groups, respectively. Further, the values of the person (ASGPT31P1), the person (ASGPT31P2), the person (ASGPT32P1), the person (ASGPT32P2), the person (ASGPT33P1), and the person (ASGPT33P2) shown in FIG. 13 are the feature amounts of the persons belonging to the relevant groups, respectively. It is desirable that the sensor used for the feature extraction produces sensor signals that can show surrounding environment and it is also possible to obtain and use not only the values of sounds (SSSDs) but also temperature (TRTE), illuminance (TRIL), or a feature amount (zero-cross, energy, variance, or a regression coefficient) obtained from sounds (SSSDs), temperature (TRTE), or illuminance (TRIL). Otherwise, it is also possible to obtain the above values by subjecting sensor signals to first differentiation or second differentiation.

In the personal feature extraction (ASPF), a feature amount showing the environment of a site is extracted from sensor signals of a terminal not belonging to any group. On the occasion of the extraction, it is necessary to use the same feature extraction method as the method used for the feature amount in the group feature extraction (ASGF) since the feature amount is compared with the group feature extraction (ASGF) afterward. In the feature extraction method, for example, the average of sounds, the maximal value of sounds, the minimum value of sounds, and the dispersion of sounds are obtained. The results are assigned to the group/person feature quantity database (ASDBGPF).

The value of the person 4 (ASGPT34) shown in FIG. 13 is the feature amount of the person. It is desirable that the sensor used for the feature extraction produces sensor signals that can show surrounding environment and it is also possible to obtain and use not only the values of sounds (SSSDs) but also temperature (TRTE), illuminance (TRIL), or a feature amount (zero-cross, energy, variance, or a regression coefficient) obtained from sounds (SSSDs), temperature (TRTE), or illuminance (TRIL). Otherwise, it is also possible to obtain the above values by subjecting sensor signals to first differentiation or second differentiation.

Here, the group matching (ASMG) and the matching end (ASENJU) in the sequence shown in FIG. 5 in the judging function 3 are the same as the case of the judging function 1.

Meanwhile, the sensor database (SSDBSE) is a database to store sensor signals such as the aforementioned infrared sensor information and an example thereof is shown in FIG. 7. The time (SSTI) represents the time when sensor signals are acquired. The content (SSCD) represents sensing values of sensor signals. The time stamp (SSTS) represents the time of acquisition at a terminal (TR) or a base station (BA). The terminal ID (SSTD) represents the ID of a terminal (TR) subjected to sensing. The infrared (SSID) represents a sensing value by infrared (TRIR) The temperature (SSTE) represents a sensing value by temperature (TRTE). The sound (SSSD) represents a sensing value of a microphone (TRMI). The acceleration (SSAD) represents a sensing value by acceleration (TRAC). The illuminance (SSLD) represents a sensing value by illuminance (TRIL).

The group/person database (ASDBGP) is a database to store the results of group analysis and an example thereof is shown in FIG. 8. The terminal [name] (ASTD) represents a terminal number. In the time (ASTI), a same number is given to each group regarded as the same group as a result of group analysis for each time.

FIG. 9 shows an example of sensor signals produced by integrating feature amounts for each of the groups. The values are aligned in temporal sequence and the group 1 (ASGPT11G), the group 2 (ASGPT12G), the group 3 (ASGPT13G), and the person 4 (ASGPT14) are shown in the order from the top.

FIG. 10 shows an example of sensor signals individually showing feature amounts of each person in each of the groups. The values are aligned in temporal sequence and a person of the group 1 (ASGPT11P1), another person of the group 1 (ASGPT11P2), a person of the group 2 (ASGPT12P1), another person of the group 2 (ASGPT12P2), a person of the group 3 (ASGPT13P1), another person of the group 3 (ASGPT13P2), and the person 4 (ASGPT14) are shown in the order from the top.

FIG. 11 shows an example of sensor signals produced by integrating feature amounts for each of the groups. The values are aligned in temporal sequence and the group 1 (ASGPT21G), the group 2 (ASGPT22G), the group 3 (ASGPT23G), and the person 4 (ASGPT24) are shown in the order from the top.

FIG. 12 shows an example of sensor signals individually showing feature amounts of each person in each of the groups. The values are aligned in temporal sequence and a person of the group 1 (ASGPT21P1), another person of the group 1 (ASGPT21P2), a person of the group 2 (ASGPT22P1), another person of the group 2 (ASGPT22P2), a person of the group 3 (ASGPT23P1), another person of the group 3 (ASGPT23P2), and the person 4 (ASGPT24) are shown in the order from the top.

The group/person feature quantity database (ASDBGPF) is a database to store feature amounts for group analysis and an example thereof is shown in FIG. 13. The feature amount (ASFE) means feature amounts for group analysis. The feature amounts may be obtained from sensor signals and the examples of the feature amounts are the average of sounds (ASFE1), the maximal value of sounds (ASFE2), the minimum value of sounds (ASFE3), and the dispersion of sounds (ASFE4). When an effective feature amount is found, the feature amount may be added to the feature amounts (ASFE).

The feature amounts of each of the groups and each of the persons are stored as shown in the column of the group/person (ASGP). When persons belong to a group, the sensor signals are assembled in the group. In the case of the group 1 (ASGPT31) for example, the feature amounts of the total (ASGPT31G) are stored from the total of the sensor signals and the feature amounts of the person (ASGPT31P1) and the person (ASGPT31P2) are stored from the sensor signals of each of the persons belonging to the group. In this way, the feature amounts of the total and the persons of a group are stored for each group. Further, when a person does not belong to a group, the feature amounts of the person himself are stored. An example thereof is the person 4 (ASGPT34).

In Embodiment 1 explained above, it is possible to detect terminals (TRs) even without face-to-face contact by grouping the terminals (TRs) in two stages in accordance with the features of sensor signals of the first and second sensors obtained from the terminals (TRs) and subjecting the sensor signals to group analysis. Further, with regard to the frequency of the comparison of terminals in group analysis, although the frequency of analysis is the factorial of the number of the terminals since the analysis has to be applied to all the terminals in the case of not grouping the terminals in two stages, it is possible to reduce the frequency of the analysis by grouping the terminals in two stages.

Embodiment 2

The second embodiment is a group analysis system that allows periodical time synchronization of terminals. When group analysis is carried out with signals sensed at terminals (TRs), since the analysis is carried out with signals from plural terminals (TRs), it is desirable to obtain the signals of as close time as possible. The reason is that, although no problem occurs when the time of periodical sensing data sending (SDSF) is the same as sampling time (SPT), the problem arising when the time of periodical sensing data sending (SDSF) is different from sampling time (SPT) is that signals of the same time cannot be obtained. As a result, analysis accuracy is not likely to improve. A system capable of coping with the problem is provided in the second embodiment.

Figure 14:
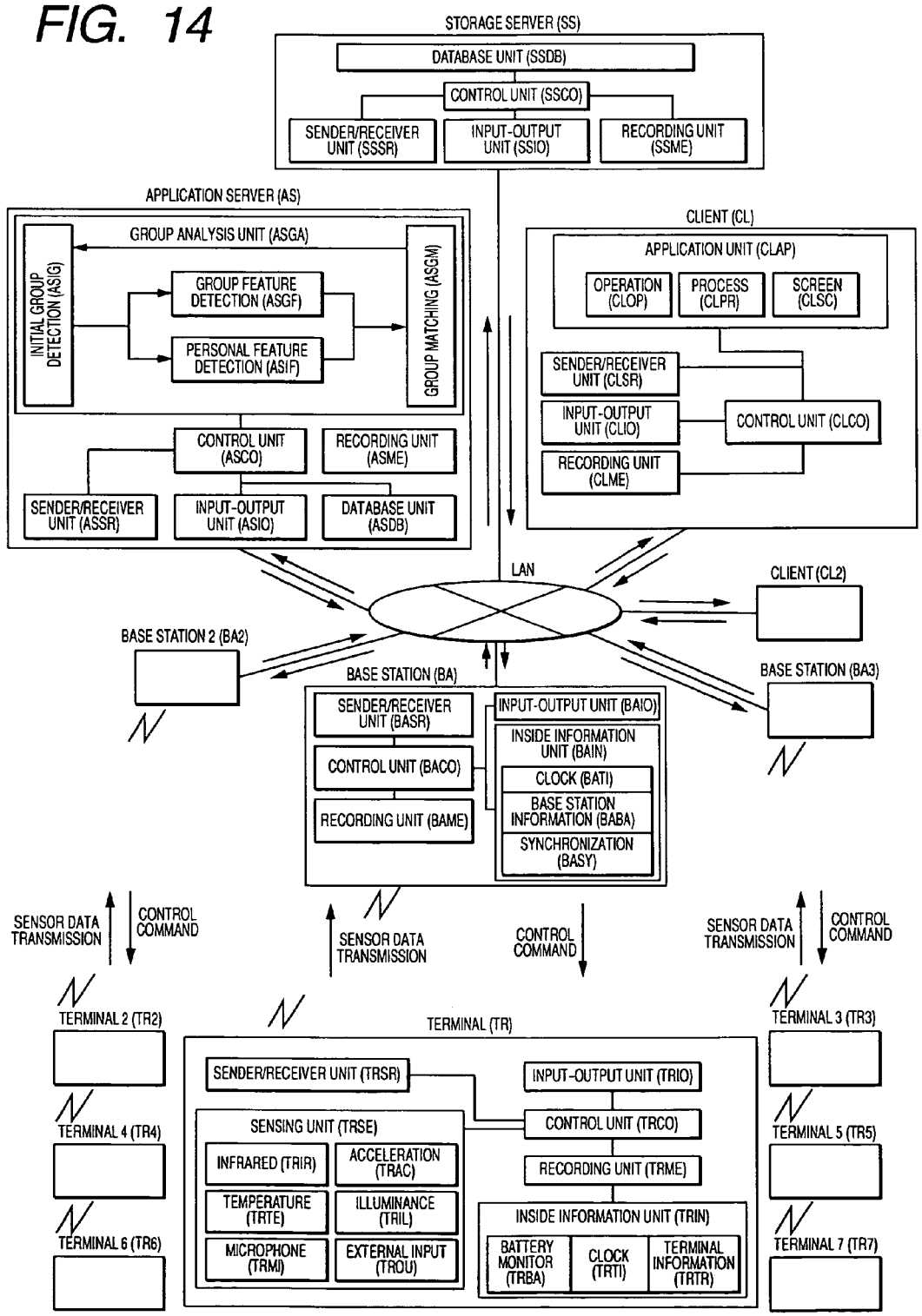
FIG. 14 is a view showing the whole configuration from terminals to transmit sensor signals to an application unit to display group analysis results according to the second embodiment of the present invention.

The group analysis system of the second embodiment shown in FIG. 14 is configured by modifying a part of the whole system ranging from terminals to transmit sensor signals to an application to display group analysis results shown in FIG. 1. The modification is the addition of synchronization (BASY) to the inside information unit (BAIN) in a base station (BA). The synchronization (BASY) represents the process of synchronizing the clock time of plural terminals (TRs) and the clock time when signal data are acquired from terminals (TRs) is synchronized periodically.

Figure 15:
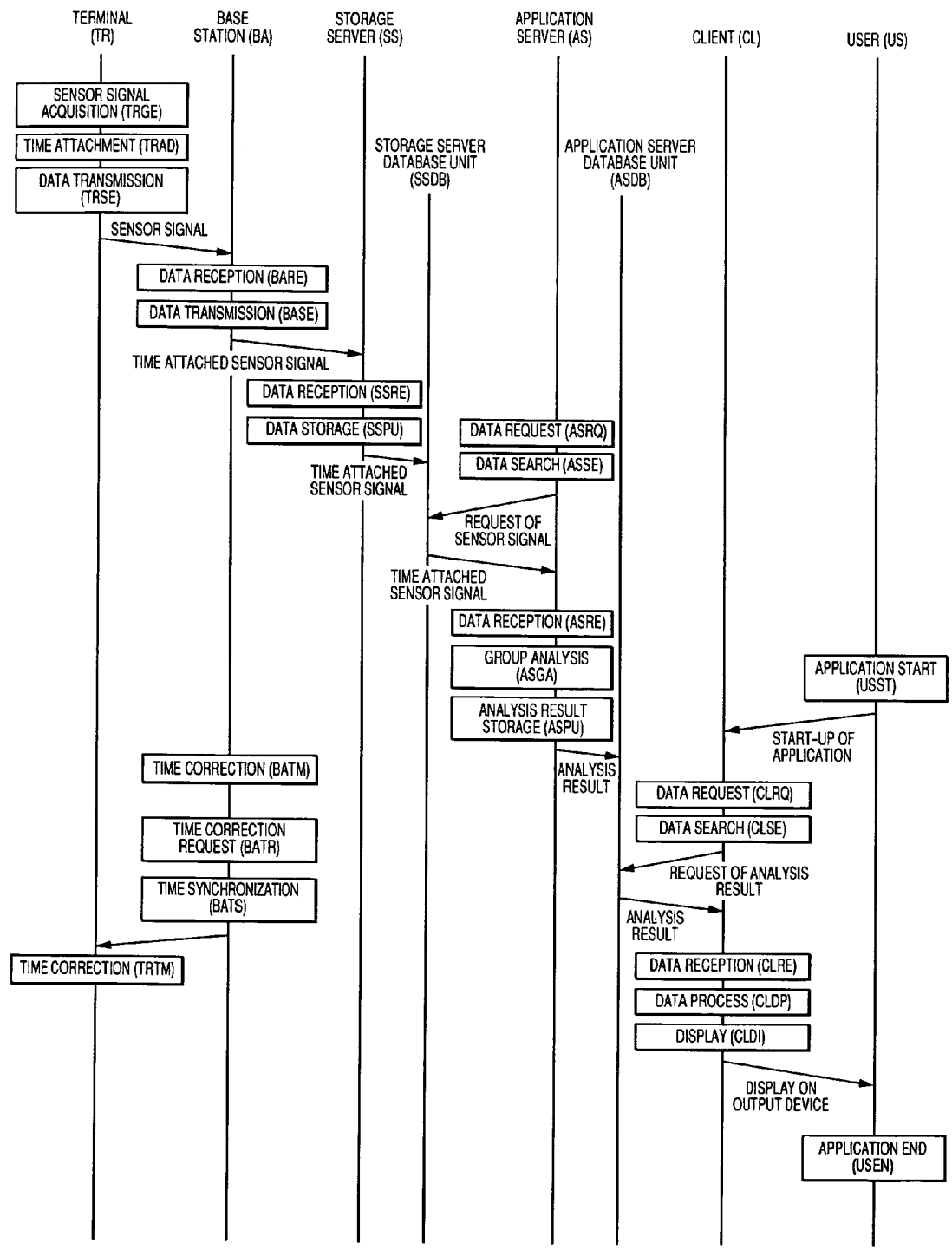
FIG. 15 is a view showing the sequence of sensor signals while they are transmitted from a terminal 1 (TR1) to a user (US) in the second embodiment.

FIG. 15 is a view showing the sequence of sensor signals while they are transmitted from a terminal (TR) to a user (US) in the second embodiment and a part of the view in FIG. 3 is modified. The modification is the addition of time synchronization (BATS) to the processes in a base station (BA) In the time synchronization (BATS), synchronization is carried out in order to adjust acquisition timing of sensor signals among terminals (TRs) belonging to the area of a base station (BA).

The flowchart of the group analysis when the acquisition time of the sensor signals of plural terminals (TRs) is identical is the same as the flowchart of Embodiment 1 shown in FIG. 5. In the case shown in FIG. 5, the judging functions are specified for each sensing type as shown in FIG. 6. In the case of the present embodiment however, operation can be carried out through the same process. That is, since the sensor signals of the same clock time can be obtained even when the time of periodical sensing data sending (SDSF) is different from sampling time (SPT), it is possible to apply the process of the sensing type 1 (ST1) too. Consequently, the processes of both the sensing type 1 (ST1) and the sensing type 2 (ST2) can be applied. Consequently, detailed explanations are omitted here.

In Embodiment 2 explained above, it is possible to carry out group analysis with a high degree of accuracy even with sensor signals of a small period of time by synchronizing the acquisition time of sensor signals of plural terminals (TRs).

What is claimed is:

1. A group analysis system comprising a plurality of sensor terminals and a controller connected to said plural sensor terminals, wherein each of said sensor terminals has a first sensor to detect relative positions and a second sensor to acquire surrounding environmental information, and wherein said controller has an input-output unit to acquire sensor signals from said first and second sensors in each of said sensor terminals, and an analyzer to set an initial group of said sensor terminals with said sensor signals from said first sensor, extract the feature quantity of said initial group from said sensor signals of said second sensor received from each of said sensor terminals constituting said initial group, and decide a group to which a sensor terminal not belonging to said initial group belongs by comparing said feature quantity of said initial group with the feature quantity, corresponding to said feature quantity of said initial group, extracted from sensor signals of said second sensor of said sensor terminal not belonging to said initial group.

2. The group analysis system according to claim 1, wherein said first sensor has a high directivity.

3. The group analysis system according to claim 2, wherein:

said first sensor is an infrared-ray sensor; and said controller carries out face-to-face detection between said sensor terminals with the sensor signals of said infrared-ray sensor when said initial group is decided.

4. The group analysis system according to claim 1, wherein said second sensor is a sensor to detect sound.

5. The group analysis system according to claim 4, wherein said feature quantity of said initial group is the average of sensor signals of said sensor to detect sound received from each of said sensor terminals constituting said initial group.

6. The group analysis system according to claim 1, wherein said sensor terminals and said controller are connected to each other through a network including base stations to carry out radio communication with said sensor terminals.

7. The group analysis system according to claim 6, wherein said sensor terminals and said base stations carry out time adjustment periodically upon request of time correction from said base stations to said sensor terminals.

8. Group analysis equipment to carry out group analysis of a plurality of sensor terminals, said group analysis equipment comprising:
   an input-output unit to acquire sensor signals of a first sensor to detect relative positions and sensor signals of a second sensor to acquire surrounding environmental information from each of said sensor terminals; and
   an analyzer to set an initial group of said sensor terminals on the basis of said sensor signals of the first sensor, extract the feature quantity of said initial group from said sensor signals of said second sensor received from each of said sensor terminals constituting said initial group, extract a feature quantity, corresponding to said feature quantity of said initial group, from sensor signals of said second sensor of a sensor terminal not belonging to said initial group, and decide a group to which said sensor terminal not belonging to said initial group belongs by comparing said feature quantity of said initial group with the feature quantity corresponding to said feature quantity of said initial group.

9. The group analysis equipment according to claim 8, wherein said first sensor is an infrared-ray sensor, and wherein said analyzer carries out face-to-face detection between said sensor terminals with the sensor signals of said infrared-ray sensor when said initial group is decided.

10. The group analysis equipment according to claim 8, wherein said second sensor is a sensor to detect sound.

11. The group analysis equipment according to claim 10, wherein said feature quantity of said initial group is the time series average of sensor signals of said sensor to detect sound received from each of said sensor terminals constituting said initial group.

12. Group analysis equipment to carry out group analysis of a plurality of sensor terminals, said group analysis equipment comprising:
   an input-output unit to acquire sensor signals of an infrared-ray sensor and sensor signals of a sensor to acquire surrounding environmental information from each of said sensor terminals; and
   a controller to set an initial group of said sensor terminals with the sensor signals of said infrared-ray sensor, extract the feature quantity of said initial group from sensor signals of said sensor to acquire surrounding environmental information received from said sensor terminals constituting said initial group, extract a feature quantity, corresponding to said feature quantity of said initial group, of a sensor terminal not belonging to said initial group, and decide a group to which said sensor terminal not belonging to said initial group belongs by comparing said feature quantity of said initial group with said feature quantity corresponding to said feature quantity of said initial group.

13. The group analysis equipment according to claim 12, wherein said sensor to acquire said surrounding environmental information is a sensor to detect sound, and wherein said controller uses, as said feature quantity of said initial group, the time series average of sensor signals of said sensor to detect sound received from each of said sensor terminals constituting said initial group.

14. The group analysis equipment according to claim 13, wherein sensor signals of said sensor to acquire said surrounding environmental information input from said input-output unit are the signals sampled for a shorter period of time than the transmission cycle of said sensor signals transmitted from said sensor terminals.

15. The group analysis equipment according to claim 14, wherein said controller computes the average of feature amounts at the portions where said sampled sensor signals overlap with each other on a temporal axis when said feature quantity of said initial group is extracted.

* * * * *